UNITED STATES PATENT OFFICE.

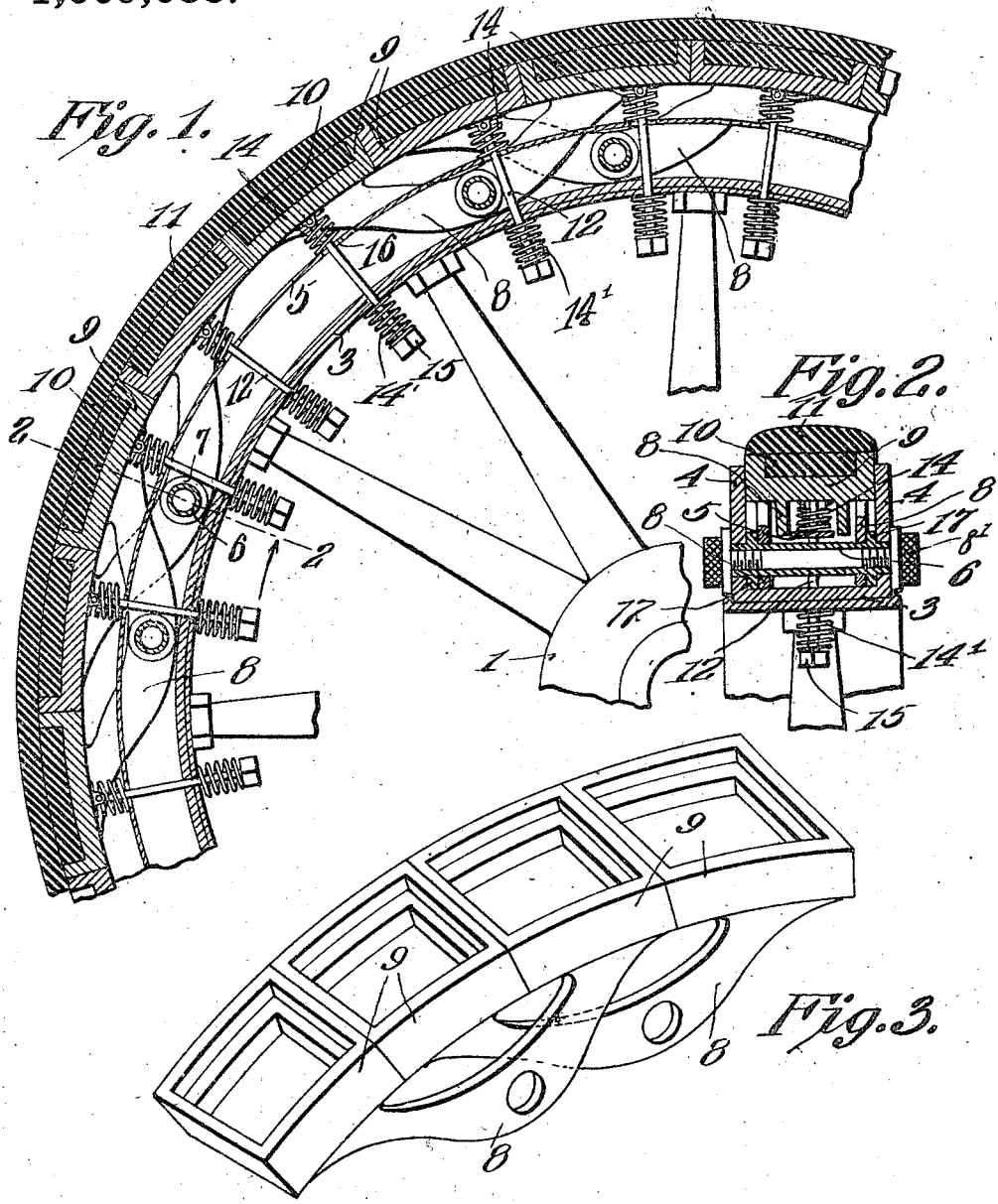

CHARLES S. MYERS, OF COLUMBIA, PENNSYLVANIA.

AUTOMOBILE-WHEEL.

1,009,088.	Specification of Letters Patent.	Patented Nov. 21, 1911.

Application filed September 27, 1910. Serial No. 584,119.

*To all whom it may concern:*

Be it known that I, CHARLES S. MYERS, a citizen of the United States, residing at Columbia, in the county of Lancaster and State of Pennsylvania, have invented a new and useful Automobile-Wheel, of which the following is a specification.

This invention relates to vehicle wheels of that type better known as spring wheels and has for its object the provision of a novel form of tire having its tread portion supported by the terminal portions of members mounted for rocking movement upon the main rim of the wheel, these terminal portions being yieldingly supported relative to the wheel rim and the said rocking members interfitting so as to be successively actuated or tilted while the wheel is rotating under a load.

A further object is to provide means whereby the elasticity of the tire may be varied so as to render the tire useful in connection with different types of vehicles.

With the foregoing and other objects in view which will appear as the description proceeds, the invention resides in the combination and arrangement of parts and in the details of construction hereinafter more fully described and claimed, it being understood that changes in the precise embodiment of the invention herein disclosed can be made within the scope of what is claimed without departing from the spirit of the invention.

In the accompanying drawings, the preferred form of the invention has been shown.

In said drawings:—Figure 1 is a central longitudinal section through a portion of a wheel constructed in accordance with the present invention. Fig. 2 is a section on line 2—2 Fig. 1. Fig. 3 is a perspective view of two interfitting rocking members.

Referring to the drawings, 1 designates a hub from which project radial spokes. These spokes connect with the main rim 3, having integral annular flanges 4, between which the supplemental rim 5 is arranged, as shown in Fig. 1. Extending transversely of the flanges 4, and between the main rim and the supplemental rim, are hollow pins 6, arranged in pairs and provided, adjacent their ends, with integral collars 7, which abut against adjacent faces of the flanges 4, to hold the pins against longitudinal displacement. Portions of the pins project beyond the shoulders and penetrate said flanges 4. Screws 8' project into and engage the ends of the pins and their heads engage the outer faces of the said flanges 4, to prevent distortion of the flanges.

Rocking members 8 are arranged on pins 6 and each end of each rocking member carries a tire section 9. Each section 9 is cup shaped and holds a yielding filling 10 of fiber, rubber or the like, there being a tread in the form of an annular band or hoop 11 preferably of a similar material extending about the wheel.

Projecting radially from each section 9 of the tire, and pivoted to them, are pins 12, which pass through the supplemental and main rims of the wheel. Coiled springs 14 and 14' are arranged on these pins and bear upon the outer face of the supplemental rim, and upon the inner face of the main rim respectively. The inner extremities of the said pins are threaded, and are engaged by wing nuts 15, whereby the tension of the springs may be regulated. By providing these springs, resiliency is afforded between each cup shaped section and the supplemental rim. Slots 16 are formed in the main and supplemental rims, to allow the pins 12 to have necessary transverse movement.

It will be apparent that when a wheel, such as has been described, is rotated while supporting a load, the cup shaped members 9 will be successively pressed inwardly against the stress of the spring 14 interposed between said members and the rim 5, the resiliency of the tire being dependent upon the adjustment of the nuts 15.

The various parts of the tire can be readily assembled, and, when once placed in position, will not easily get out of order. If, however, any part should become broken or unduly worn, it can be easily removed and another part substituted therefor.

A tire such as described possesses all of the advantages of a pneumatic tire and is furthermore desirable because of its lightness and compactness.

It will be noted that the flanges 4 fit snugly against the sides of the cup like members 9 and thus prevent the admission of dust and other undesirable substances into the space between said members 9 and the rim of the wheel.

It will be seen that the sections 9 form practically a continuous tread supporting rim, each of said sections being fitted snugly between the next two adjoining sections.

It will be seen that when one of the springs 14 is placed under stress by the inward movement of the adjacent cup like section 9, the spring 14' connected to the remote end of the rocking member will also be placed under stress, the two springs thus operating simultaneously to resist the radial movement of the section 9 subjected to pressure.

What is claimed is:—

1. The combination with a wheel structure including a rim, of an annular series of members mounted on the rim and adapted to rock independently relative to the rim, each member having each terminal portion fitted snugly between and movable relative to the terminal portions of the next adjoining member, elastic means connected to said terminal portions for controlling the rocking movement of the members, and a tread portion supported by the terminals.

2. The combination with a wheel structure including a rim, of an annular series of lapping members mounted for independent rocking movement, said members being connected to the rim, recessed devices carried by the ends of said rocking members, each of said devices being fitted snugly between and movable relative to the corresponding devices on the next adjoining member, adjustable elastic means connected to the terminal portions of the rocking members for controlling the movement thereof, and a continuous tread portion carried by said recessed devices.

3. The combination with a wheel structure including a flanged rim, and a supplemental rim interposed between the flanges, of interfitting, independently movable rocking members extending across the supplemental rim and being connected to the flanged rim, cup like devices carried by the terminals of said members, each device being fitted snugly between and movable relative to the corresponding devices of the next adjoining member, a spring interposed between each of said devices and the supplemental rim, pins extending from each of said devices and through the springs and the rims, a spring upon each pin and bearing upon the flanged rim, and means engaging each pin for regulating the tension of the springs.

In testimony that I claim the foregoing as my own, I have hereto affixed my signature in the presence of two witnesses.

CHARLES S. MYERS.

Witnesses:
D. L. GLATFELTER,
W. M. GROFF.